(12) United States Patent
Desouky et al.

(10) Patent No.: US 11,961,014 B2
(45) Date of Patent: Apr. 16, 2024

(54) GENERATING AND PRESENTING USER INSIGHTS IN ASSOCIATION WITH USER-TO-USER ELECTRONIC COMMUNICATION

(71) Applicant: ROYAL BANK OF CANADA, Toronto (CA)

(72) Inventors: Anas Desouky, Toronto (CA); Nadia Ghobadipasha, Toronto (CA); Chengxi Yang, Toronto (CA); Zachary Mullins, Toronto (CA); Amit Sharma, Toronto (CA); Deepak Prakash Asrani, Toronto (CA); Dicken Tak Kuen Leung, Toronto (CA)

(73) Assignee: Royal Bank Of Canada, Toronto (CA)

( * ) Notice: Subject to any disclaimer, the term of this patent is extended or adjusted under 35 U.S.C. 154(b) by 353 days.

(21) Appl. No.: 16/992,484

(22) Filed: Aug. 13, 2020

(65) Prior Publication Data
US 2021/0049487 A1 Feb. 18, 2021

Related U.S. Application Data

(60) Provisional application No. 62/886,577, filed on Aug. 14, 2019.

(51) Int. Cl.
| | | |
|---|---|---|
| G06F 3/048 | (2013.01) |
| G06F 3/04842 | (2022.01) |
| G06N 5/04 | (2023.01) |
| G06N 20/00 | (2019.01) |
| G06Q 10/107 | (2023.01) |
| G06Q 30/016 | (2023.01) |
| G06Q 30/0282 | (2023.01) |
| H04L 51/42 | (2022.01) |

(52) U.S. Cl.
CPC ............ *G06N 5/04* (2013.01); *G06F 3/04842* (2013.01); *G06N 20/00* (2019.01); *G06Q 10/107* (2013.01); *G06Q 30/016* (2013.01); *G06Q 30/0282* (2013.01); *H04L 51/42* (2022.05)

(58) Field of Classification Search
CPC .. H04L 51/42; G06Q 30/0282; G06Q 30/016; G06Q 10/107; G06F 3/04842; G06N 20/00; G06N 5/04
See application file for complete search history.

(56) References Cited

U.S. PATENT DOCUMENTS 10,594,757 B1 * 3/2020 Shevchenko ......... H04L 67/306
11,500,885 B2 * 11/2022 Horesh ................. G06F 40/205
(Continued)

*Primary Examiner* — Rashawn N Tillery
(74) *Attorney, Agent, or Firm* — Norton Rose Fulbright Canada LLP

(57) ABSTRACT

Disclosed are systems, methods, and devices for presenting customer insights in association with an electronic customer relationship management tool. A graphical user interface (GUI) is presented to a user. The GUI has a first region having GUI elements of the customer relationship management tool, and a second region having GUI elements for presenting at least one customer insight, the second region displayed when the first region is displayed and proximate to the first region. Upon receiving an identifier identifying a particular customer, at least one machine-learning derived insight relevant to the identified customer is displaying to the user in the second region when receiving user input signals via the GUI elements of the first region.

18 Claims, 26 Drawing Sheets

(56) References Cited

U.S. PATENT DOCUMENTS

| | | | |
|---|---|---|---|
| 2013/0325869 A1* | 12/2013 | Reiley | G06F 16/437 |
| | | | 707/741 |
| 2014/0013246 A1* | 1/2014 | Beechuk | G06Q 30/01 |
| | | | 715/753 |
| 2014/0122622 A1* | 5/2014 | Castera | H04L 51/04 |
| | | | 709/206 |
| 2015/0172461 A1* | 6/2015 | Cudak | H04W 4/12 |
| | | | 455/414.1 |
| 2015/0207765 A1* | 7/2015 | Brantingham | H04L 51/046 |
| | | | 715/758 |
| 2015/0339677 A1* | 11/2015 | Chan | G06Q 30/016 |
| | | | 705/7.29 |
| 2015/0350144 A1* | 12/2015 | Zeng | H04L 51/23 |
| | | | 709/206 |
| 2016/0337300 A1* | 11/2016 | Ossia | G06Q 10/107 |
| 2017/0315680 A1* | 11/2017 | Yip | H04L 51/02 |
| 2017/0344889 A1* | 11/2017 | Sengupta | G06N 20/00 |
| 2018/0189794 A1* | 7/2018 | Campos | H04L 63/0815 |
| 2018/0212908 A1* | 7/2018 | Knudson | G06F 40/279 |
| 2018/0278748 A1* | 9/2018 | Avila | G06Q 10/06398 |
| 2019/0042086 A1* | 2/2019 | White | G06Q 50/01 |
| 2019/0297186 A1* | 9/2019 | Karani | G06Q 30/01 |
| 2020/0065848 A1* | 2/2020 | Gupta | G06Q 30/0224 |
| 2020/0097303 A1* | 3/2020 | O'Kane | G06F 3/0481 |
| 2020/0097917 A1* | 3/2020 | Beaujon | H04L 51/08 |
| 2021/0118546 A1* | 4/2021 | Ramakrishnan | |
| | | | G06Q 10/063114 |

* cited by examiner

Blink

Product Interests

| Product | Mention |
|---|---|
| KNX | Discussed 2Q14 outlook and issues/trends below the surface that could result in increased volatility in 2H14 in AF & ST coverage universe. vm inbox was full, will follow up with email. |
| KEX | Discussed report concerning company Y investment and implications for transports, also discussed rail report,and the combination of company Y report Mexico near-shoring report and Rail report as basis for UNP upgrade. asked about attending the R meeting next week. |

Key Touchpoints

| Date | Summary |
|---|---|
| in a day | WSP- he would prefer to see smaller tuck in acquisitions vs Parsons size- thinks without acquisition of Focus and WSP leagacy GNV would have been a disaster. |
| in a day | follow up post call - he is curious why stock trading off - thought call was fine |

Concerns

| Date | Concern |
|---|---|
| in a day | LM on concerns relating to deal with siemens |
| in 8 hours | still bullish APL and thinks South TX concerns overblown; he really likes GSJK here and think it outperforms into YE; thinks RGP ultimately buys out USAC |

FIG. 4B

| Concerns | | |
|---|---|---|
| Date | Concern | |
| in a day | LM on concerns relating to deal with company X | — 170 |
| in 8 hours | still bullish APL and thinks South TX concerns overblown; he really likes GSJK here and think it outperforms into YE; thinks RGP ultimately buys out USAC | — 170 |
| in 2 days | full rundown on numbers - as well as capex beat and covering off IOC (his main concern). | — 170 |
| 6 days ago | aksing on PVA - horrible quarter ... how much stock going down? However he seemed incluinded to be a buyer on weakenesdsd. Thinks analyst concerned over EURs are jumping all over this but not necessaruily warranted. Was this helpful? 180 182 | — 170 |
| 15 days ago | We also talked RRC as well into the quarter and he seems a little concerned. | |
| 7 days ago | LIVE - talked over A380, and whether that is a problem for Airbus to fill the slots. | — 170 |
| 2 months ago | Discussed report concerning company Y investment and implications for transports, also discussed rail report, and the combination of company Y report Mexico near-shoring report and Rail report as basis for UNP upgrade. | — 170 |

| | | | |
|---|---|---|---|
| KEX | 2 months ago | Discussed report concerning investment and implications for transports, also discussed rail report, and the combination of Gulf Coast report, Mexico near-shoring report and Rail report as basis for UNP upgrade. asked about attending the R meeting next week. Was this helpful? 180 182 | —170 |
| | 25 days ago | Discussed 2Q14 outlook and issues/trends below the surface that could result in increased volatility in 2H14 in AF & ST coverage universe. vm inbox was full, will follow up with email. | —170 |
| | 25 days ago | Discussed 2Q14 outlook and issues/trends below the surface that could result in increased volatility in 2H14 in AF & ST coverage universe. vm inbox is full, will follow up with email. | —170 |

GENERATING AND PRESENTING USER INSIGHTS IN ASSOCIATION WITH USER-TO-USER ELECTRONIC COMMUNICATION

CROSS-REFERENCE TO RELATED APPLICATIONS

This application claims all benefit including priority to U.S. Provisional Patent Application 62/886,577, filed Aug. 14, 2019, and entitled "GENERATING AND PRESENTING USER INSIGHTS IN ASSOCIATION WITH USER-TO-USER ELECTRONIC COMMUNICATION"; the entire contents of which are hereby incorporated by reference herein.

FIELD

This disclosure relates to machine learning, and more specifically to generation and presentation of customer insights.

BACKGROUND

Customer relationship management (CRM) is an important aspect of an enterprise's management of engagements with existing and potential customers. CRM processes and software generate large volumes of data which present myriad challenges in relation to processing and understanding such data. Some challenges are particularly acute in enterprises with a large number of customers and a large number of personnel tasked with communicating with customers.

SUMMARY

In accordance with one aspect, there is provided a computer-implemented method for presenting customer insights in association with an electronic customer relationship management tool. The method includes: presenting, to a user, a graphical user interface (GUI) having: a first region having GUI elements of the customer relationship management tool, and a second region having GUI elements for presenting at least one customer insight, the second region displayed when the first region is displayed and proximate to the first region. The method also includes upon receiving an identifier identifying a particular customer: displaying, to the user, at least one machine-learning derived insight relevant to the identified customer in the second region when receiving user input signals via the GUI elements of the first region.

In accordance with another aspect, there is provided a computer-implemented system for presenting customer insights in association with an electronic customer relationship management tool. The system includes at least one processor; memory in communication with the at least one processor, and software code stored in the memory. The software code when executed by the at least one processor causes the system to: present, to a user, a graphical user interface (GUI) having: a first region having GUI elements of the customer relationship management tool, and a second region having GUI elements for presenting at least one customer insight, the second region displayed when the first region is displayed and proximate to the first region; and upon receiving an identifier identifying a particular customer: display, to the user, at least one machine-learning derived insight relevant to the identified customer in the second region when receiving user input signals via the GUI elements of the first region.

In accordance with yet another aspect, there is provided a computer-implemented method of augmenting a customer relationship management tool to provide customer insights The method includes: presenting, to a user, within the customer relationship management tool, first GUI elements for displaying customer relationship management data, integrating a customer insights plugin with the customer relationship management tool, to present second GUI elements for displaying customer insights, the second GUI elements displayed when the first GUI elements are displayed, and proximate the first GUI elements; and upon receiving an identifier identifying a particular customer: displaying, to the user, at least one machine-learning derived insight relevant to the identified customer via the second GUI elements when receiving user input signals via the GUI elements of the first region.

Many further features and combinations thereof concerning embodiments described herein will appear to those skilled in the art following a reading of the instant disclosure.

DESCRIPTION OF THE FIGURES

In the figures,

FIGS. 4A, 4B, 4C, and 4D are each example GUI portions of an insights plugin of the front-end of FIG. 2, in accordance with an embodiment;

DETAILED DESCRIPTION

Figure 1:
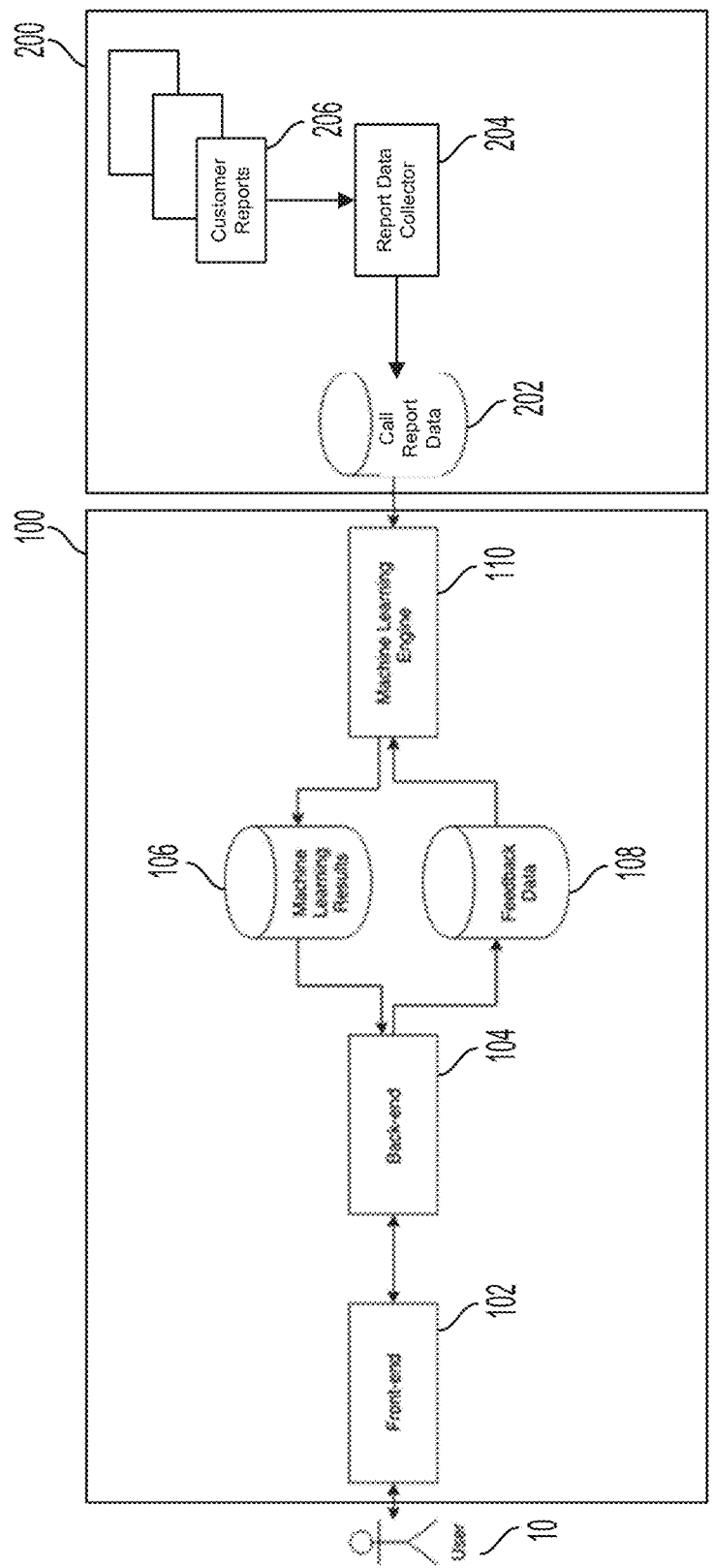
FIG. 1 is a schematic diagram of a customer insight system and a customer relationship management system, in accordance with an embodiment.

FIG. 1 schematically depicts a customer insight system 100 adapted to generate and present customer insights in association with an electronic customer relationship management (CRM) tool, in accordance with an embodiment. As depicted, system 100 is interconnected with a CRM system 200 that is used to receive and store data regarding communications and other interactions with customers.

Customer insight system 100 includes a front-end 102 configured to function both as a CRM tool and as an interface for delivering insights to users and for receiving user input.

Front-end 102 is operated by one or more users 10, who may each be engaged in CRM activities such as account management, sales, customer service, or the like. In an example enterprise that is a financial institution, users 10 may include traders, research analysts, sales managers, business heads, or the like.

System 100 also includes a back-end 104 that implements logic for retrieving relevant insights from machine learning results based on user input received through front-end 102 (e.g., which particular customer a user 10 is engaging with), and for receiving data reflective of feedback from user 10 regarding the importance (e.g., usefulness and/or relevance) of particular presented insights. Insights are retrieved by back-end 104 from an electronic data store 106 storing machine learning results. Feedback data received by back-end 104 from front-end 102 are stored in an electronic data store 108.

System 100 also includes a machine learning engine 110 that generates machine learning results (including insights) by processing customer interaction data received from electronic data store 202 of system 200. In the depicted embodiment, machine learning engine 110 implements various learning algorithms as detailed herein, including unstructured learning algorithms, algorithms operating on unlabeled data, and the like. Machine learning engine 110 assigns an importance score to the call report from which the insight was generated, and refines such scores based on feedback data (e.g., stored in data store 108). Such feedback data may indicate whether particular presented insights (and call reports) are important and are used by machine learning engine 110 to train its learning models.

In some embodiments, learning models are trained continuously (i.e., as new customer interaction data or new user feedback data are received). In other embodiment, learning models are trained at set intervals (e.g., once a week, once a day, etc.). Machine learning results may be generated to provide insights for particular individual customers (or representatives of organizations), or insights for particular organizations as a whole.

In the depicted embodiment, system 200 functions in some manners similar to a conventional CRM system, e.g., such as a CRM system provided by Salesforce (San Francisco, USA). However, system 200 is configured to collect customer report data in particular manners, and to provide such data to system 100 in particular manners, e.g., according to data structures acceptable to system 100, according to APIs implemented at system 100, etc.

System 200 includes a report data collector 204 that receives various customer reports 206 on interactions with customers (e.g., reports on a meeting, phone call, or other communication with a customer, each of which may be referred to as an "engagement" or a "touchpoint"). As customer reports 206 are often generated following a telephone call with a customer, they may all also be referred to, purely for the sake of convenience, as "call reports". Such reports 206 are processed, placed into one or more pre-defined data structures, and stored in electronic data store 202.

In the depicted embodiment, system 100 and system 200 are implemented on the same computing device(s). In other embodiments, system 100 and system 200 may be located remotely from one another and be connected for data communications, e.g., by way of a private network or a public network such as the Internet. In some embodiments, system 100 may include a plurality of interconnected computers functioning as client applications of front-end 102.

Figure 2:
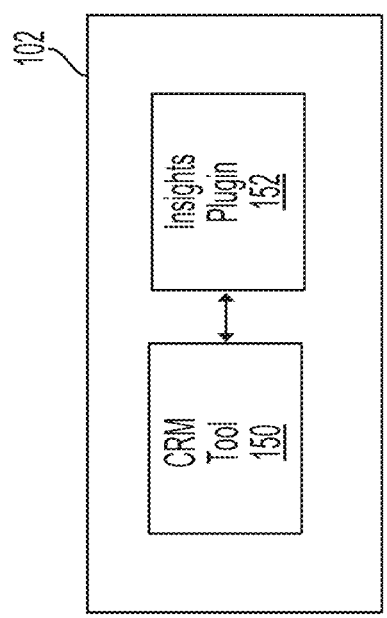
FIG. 2 is a schematic diagram of a front-end of the customer insight system of FIG. 1, in accordance with an embodiment.

FIG. 2 schematically depicts front-end 102, in accordance with an embodiment. As depicted, front-end 102 includes a CRM tool 150 and an insights plugin 152.

In the depicted embodiment, CRM tool 150 is an application for user-to-user communication, i.e., an e-mail client having functionality similar to Microsoft Outlook, Google Gmail, or the like. In other embodiments, CRM tool 150 is an application for interacting with an interconnected CRM system 200, e.g., for viewing, processing and creating customer data.

Insights plugin 152 integrates with CRM tool 150 to augment its functionality. For example, insights plugin 152 may augment the functionality of CRM tool 150 to provide additional graphical user interface (GUI) elements for presenting customer insights generated by machine learning engine 110, and for receiving user feedback regarding the importance of particular presented insights. Insights plugin 152 may be integrated with CRM tool 150 such that they share a common GUI (e.g., be in one application window), share a common application memory region, or the like. In some embodiments, insights plugin 152 may be integrated with CRM tool 150 using a plugin architecture provided by CRM tool 150. In some embodiment, insights plugin 152 may be integrated with CRM tool 150 using an application programming interface (API) exposed by CRM tool 150.

As used herein, a plugin may refer to any component that adds to, enhances, or otherwise changes the functionality of another system.

Each of front-end 102, back-end 104, and machine learning engine 110 may be implemented in whole or in part using conventional programming languages such as Java, J#, C, C++, C#, Perl, Visual Basic, Ruby, Scala, etc. These components of system 100 may be in the form of one or more executable programs, scripts, routines, statically/dynamically linkable libraries, or servlets. Aspects of front-end 102 may be implemented using GPU optimizations.

Figure 3A:
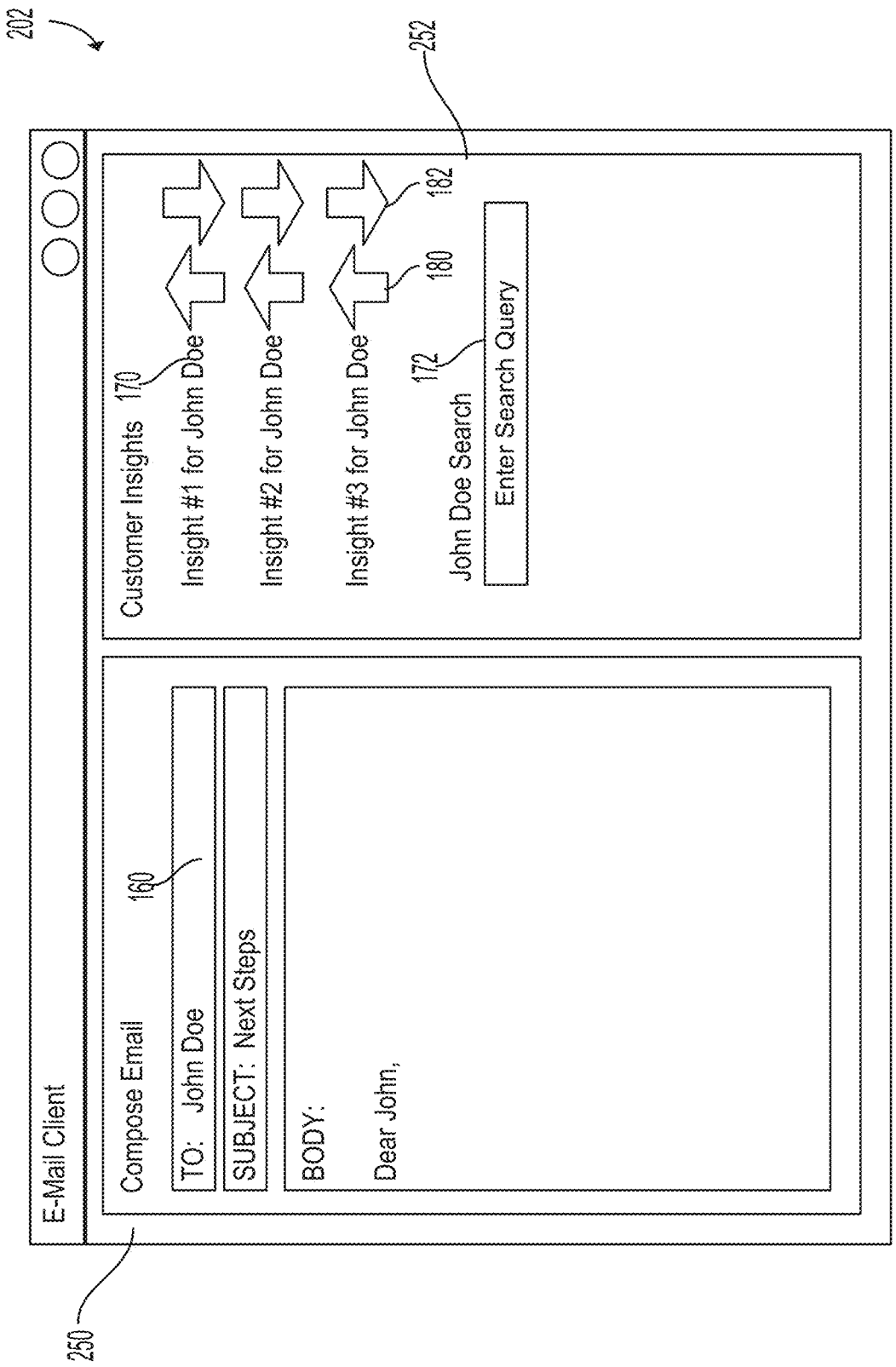
FIGS. 3A and 3B are each an example graphical user interface (GUI) of the front-end of FIG. 2, in accordance with an embodiment.
Figure 3B:
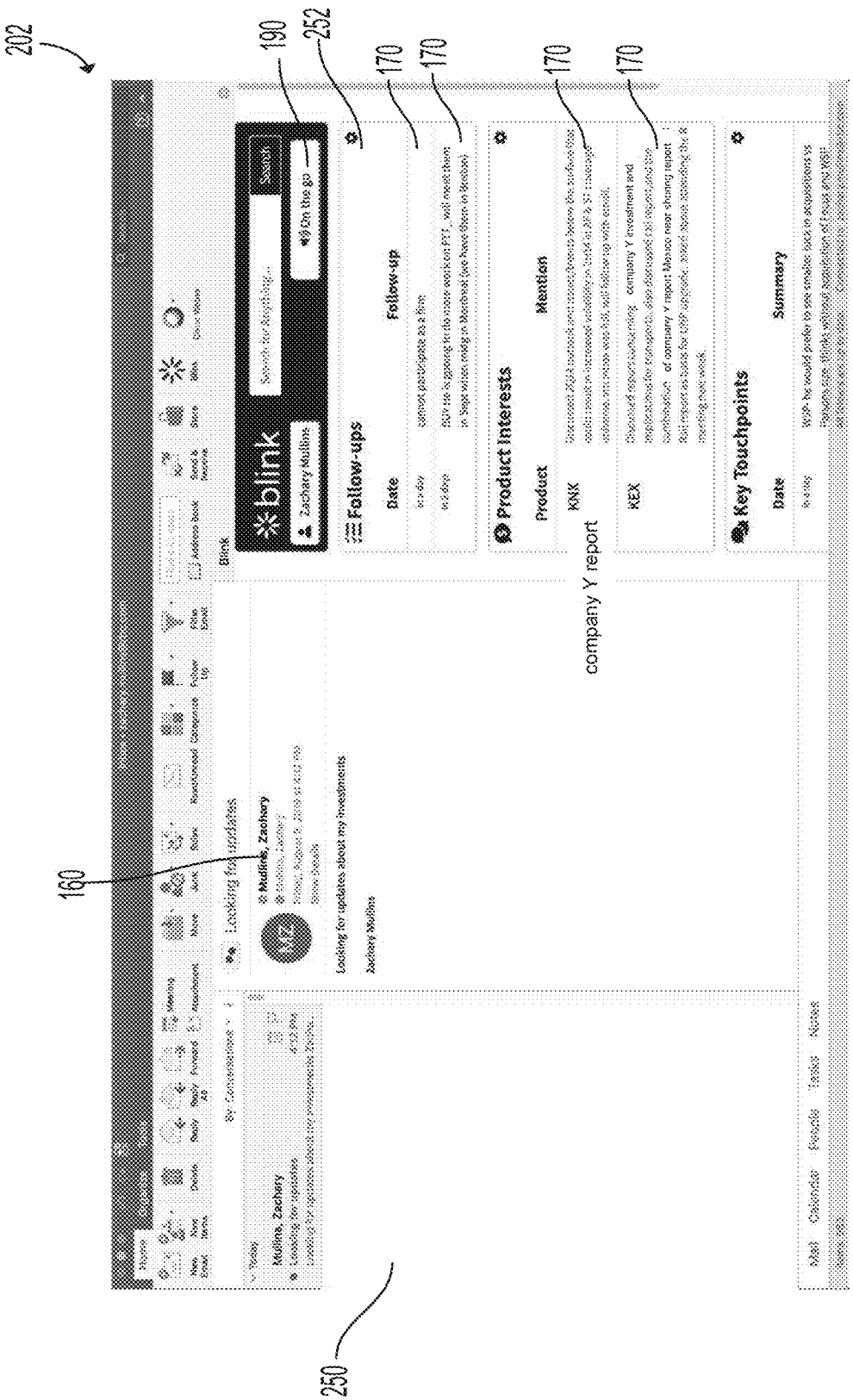

FIG. 3A shows an example screen of a GUI 202 presented by front-end 102, in accordance with an embodiment. In the depicted embodiment, CRM tool 150 is an application for sending and receiving e-mails. As shown, the GUI 202 include a first region 250 having GUI elements of CRM tool 150, and a second region 252 having GUI elements of insights plugin 152, i.e., for presenting one or more customer insights. As shown, second region 252 is presented alongside first region 250, e.g., when a user 10 is composing an e-mail to a particular customer via the GUI elements of first region 250, or otherwise providing input via the GUI elements of first region 250. Similarly, second region 252 is shown alongside first region 250 when a user 10 is viewing an e-mail received from a particular customer (FIG. 3B).

Insights plugin 152 receives an indicator (such as a name or a unique identifier) of the particular customer with whom user 10 is communicating. This indicator may be generated from data received from field 160 of first region 250 in which user 10 has inputted a unique customer identifier such as one or more names or e-mail addresses. This indicator may also be parsed from an incoming message. Insights plugin 152 sends this indicator to back-end 104, which then retrieves insights 170 relevant to the particular customer (or relevant to the customer's organization). These insights 170 are then displayed to the user through the GUI elements of second region 252.

The user can provide feedback regarding which insights are important or not important by clicking, respectively, on up arrows 180 or down arrows 182. Data reflective of such data is sent by front-end 102 to back-end 104 for storage at data store 108. The GUI of insights plugin 152 also includes a search box 172 for conducting information/document searches relevant to the particular customer (e.g., John Doe).

Conveniently, by presenting GUI elements of CRM tool 150 and insights plugin 152 through a single GUI, users 10 are presented with insights more efficiently, e.g., without the need to context-switch to another application or another window. Further, there is no need for user 10 to conduct searches for relevant insights as relevant insights are presented automatically. Such insights may be consumed by users 10 at a glance, without interrupting normal e-mail workflows. All of this improves the efficiency of computing tasks associated with CRM tool 150. Further, the functionality of CRM tool 150 is augmented, there improving its utility.

FIG. 3B shows another example screen of GUI 202 presented by front-end 102, in accordance with an embodiment. In this embodiment, CRM tool 150 is a Microsoft Outlook e-mail application, and insights plugin 152 is an Outlook add-in. As shown, a user 10 is operating CRM tool 150 to view an e-mail received from a customer. Meanwhile, insights plugin 152 presents insights relevant to this particular customer, e.g., as identified in field 160.

FIGS. 4A, 4B, 4C, and 4D are further views of GUI region 252. As shown, insights 170 may be organized visually according to category of insight. Within each category, insights 170 may be presented in an order corresponding to an importance metric of the particular call report from which a particular insight 170 is generated.

Figure 4A:

FIGS. 4A, 4B and 4C show various insights 170 presented as a user progressively scrolls down GUI region 252.

As shown in FIG. 4C and FIG. 4D, UI elements 180 and 182 may be presented in association with one or more insights 170, which allow a user to provide feedback regarding whether the associated insight 170 is important. For example, UI element 180 may be activated (e.g., clicked on, touched, etc.) by the user to provide feedback that the particular 170 is important, and UI element 182 may be activated to by the user to provide feedback that the particular 170 is not important. UI elements 180 and 182 may be presented when the associated insight 170 is activated, and be hidden otherwise.

Insights 170 may include various categories of insights such as, for example:

1) Product Interests (FIG. 4A, FIG. 4B, and FIG. 4D), e.g., which products such as stock tickers the customer has expressed interest in, the sentiment of the customer towards each of the products, etc. Such insights 170 may include links to relevant news articles (e.g., Bloomberg stock news);
2) Customer concerns (FIG. 4B), e.g., any products/news the customer is worried about and would likely desire news on;
3) Follow-ups (FIG. 4A), e.g., any action items that should be followed up on with that customers by user 10;
4) Top (e.g., most important) customers reports (which may also be referred to as "Key Touchpoints") (FIG. 4A and FIG. 4B), e.g., links to reports prioritized by importance and summarized for quick viewing; and
5) Machine-generated summaries of customer reports.

In some embodiments, having regard to the product interest category of insights, product interests insights may be sorted by a number of mentions of that product (e.g., stock ticker) by that customer. If a particular product interest insight is activated, insights plugin 152 then shows all customer mentions of that product over different call reports (as automatically summarized), sorted by an importance score determined by engine 110. If any of these mentions are activated, insights plugin 152 shows the full original call report, with the insight-associated sentence highlighted (FIG. 4C and FIG. 4D) within the call report.

Figure 5:
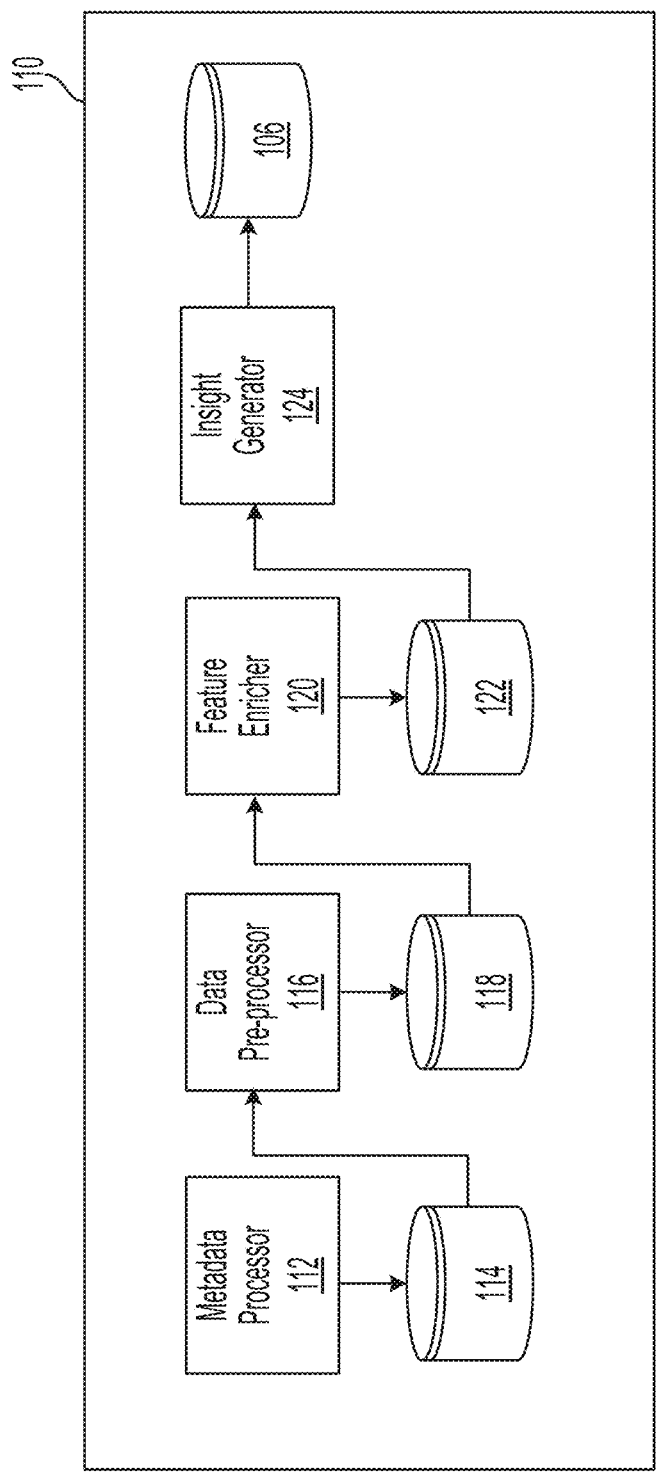
FIG. 5 is a schematic diagram of a machine learning engine of the customer insight system of FIG. 1, in accordance with an embodiment.

FIG. 5 schematically depicts machine learning engine 110, in accordance with an embodiment.

As shown, machine learning engine 110 includes a metadata processor 112 which retrieves call report data from electronic data store 202 and supplements such data with relevant metadata. Such metadata may include, for example, time of the call report, identity of a customer, identity of an employee who prepared the call report, interaction type (e.g., phone, e-mail, in-person meeting, etc.), interest subjects (i.e., products mentioned during the interaction), interaction length, and the like. Metadata processor 112 may obtain metadata from CRM system 200 or another data source extrinsic to customer insight system 100. Metadata processor 112 may extract metadata from the raw call report data, e.g., by parsing the call report data.

In some embodiments, metadata processor 112 may supplement call report data with metadata regarding a particular user 10 who is consuming the insight. This user metadata may include for example, the rank/title of the user 10, a business group the user 10 belongs to, a product group the user 10 belongs to, a relationship role the user 10 fills for a particular customer (e.g., primary, secondary, executive, portfolio management, etc.). In such embodiments, system 100 may interface with human resources databases to obtain relevant metadata.

Metadata obtained or generate by metadata processor 112 may be used as features in the machine learning workflows described herein. Call report data supplemented with metadata are stored by metadata processor 112 in electronic data store 114.

Machine learning engine 110 also includes a data preprocessor 116 which retrieves data stored in electronic data store 114 and applies pre-processing to such data. Pre-processing may include data cleaning such as, for example, removing private data, removing repeated data, and removing masking, or the like. Pre-processing may also include data normalization such as, for example, removing HTML tags, removing special characters, removing formatting, or the like. Pre-processing may also include standardization such as, for example, expanding contractions, abbreviations, or acronyms, removing certain stopwords, or the like. Pre-processed data are stored by data pre-processor 116 in electronic data store 118.

Machine learning engine 110 also includes a feature enricher 120 which retrieves data stored in in electronic data store 116 and applies feature enrichment to such data. For example, feature enricher 120 may apply business intelligence techniques to generate new features such as indicators (e.g., flags) of particular customer attendees, particular internal attendees, particular attendee title, interaction type (face-to-face or call), recency of report, number of external attendees, etc. In one specific example, a flag is set when both traders and salespeople are present in a meeting, indicating that the meeting is relatively more important. In another specific example, a flag is set when customer attendees include someone from the customer's board of directors, or who is a senior executive, etc. Feature enriched data are stored by feature enricher 120 in electronic data store 122.

Machine learning engine 110 also includes an insights generator 124 which retrieves data stored in electronic data store 122 and processes such data in accordance with the workflows described herein to generate insights (including summaries). Generated insights are stored by insights generator 124 in electronic data store 106. Such insights may be presented to users 10 by way of insights plugin 152 (FIG. 2).

Figure 6:
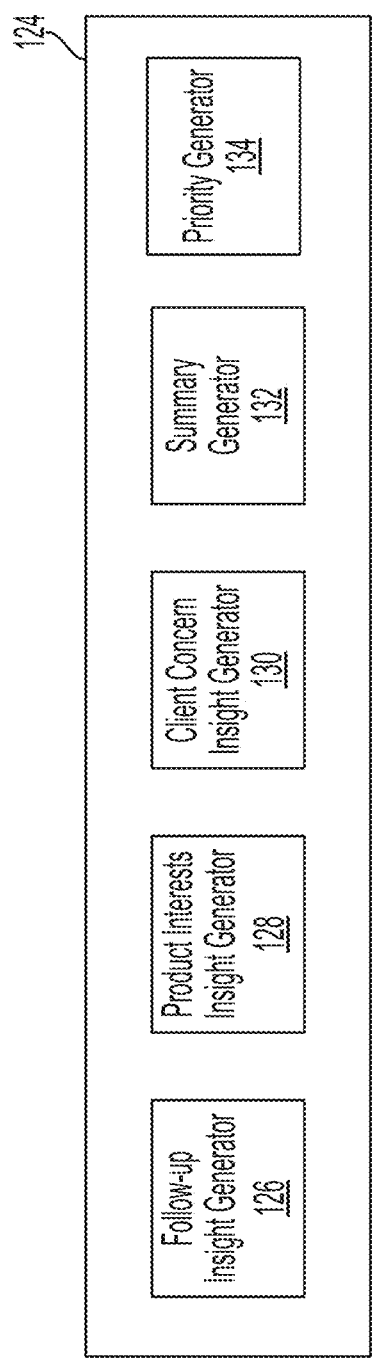
FIG. 6 is a schematic diagram of an insights generator of the machine learning engine of FIG. 5, in accordance with an embodiment.

FIG. 6 schematically depicts insights generator 124, in accordance with an embodiment. In the depicted embodiment, insights generator 124 includes the following sub-components: follow-up insight generator 126, product interest insight generator 128, customer concern insight generator 130, summary generator 132, and priority generator 134, which generate respective types of insights.

Figure 7A:
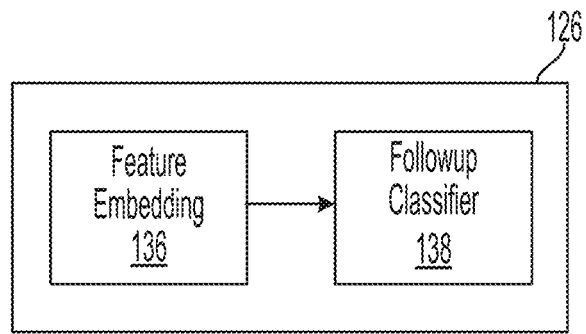
FIG. 7A is a schematic diagram of a follow-up insight generator of the insights generator of FIG. 6, in accordance with an embodiment.

FIG. 7A schematically depicts follow-up insight generator 126 for generating "Follow-up" insights from call report data, in accordance with an embodiment. As depicted, follow-up insight generator 126 includes a feature embedding 136 which transforms processed text data into numerical vectors that represent the meaning of call reports. In the depicted embodiment, this transformation is made using AI-based Natural Language Processing (NLP) model such as the InferSent feature embedding model provided by Facebook AI. Follow-up classifier 138 trains a classifier layer on top of the NLP model using public data and CRM data (e.g., from data store 202) to extract follow-up sentences.

In another embodiment, follow-up insight generator 126 applies LDA topic modeling to preprocessed report text to identify sentences related to client follow-ups. Various other clustering or classification models may also be used by follow-up insight generator 126.

Figure 7B:
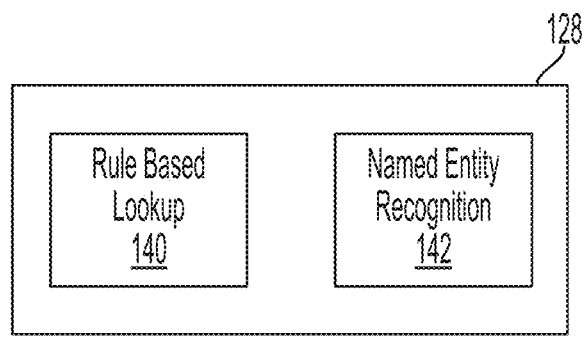
FIG. 7B is a schematic diagram of a product interest insight generator of the insights generator of FIG. 6, in accordance with an embodiment.

FIG. 7B schematically depicts product interest insight generator 128 for generating "Product Interests" insights from call report data, in accordance with an embodiment. As depicted, product interest insight generator 128 includes rule based lookup 140 and named entity recognition 142, which operate as an ensemble. Rule based lookup 140 uses products identified in a product field (column) of the call report metadata (e.g., as generated by metadata processor 112), and looks for sentences in the processed call reports (e.g., as stored in data store 122). Named entity recognition 142 can be applied to all call reports, including those for which a product has not been explicitly identified in the product field. Named entity recognition 142 applies the SpaCy NLP model to obtain entities (e.g., products) mentioned in call reports and provide correspondence sentences.

In another embodiment, when a product has been identified in the product field (column) of the call report, product interest insight generator 128 processes the call report text and extracts sentences relating to the identified product. If no such sentences are found, the report text is summarized in manners detailed with reference to FIG. 7D). The TextBlob algorithm is used to extract insight regarding the customer's sentiment towards the particular product. Alternatively, when there is no product identified, product interest insight generator 128 applies LDA topic modeling to the call report text, and then identifies sentences related to the customer's product interests. Various other clustering or classification models may also be used by product interest insight generator 128.

Figure 7C:
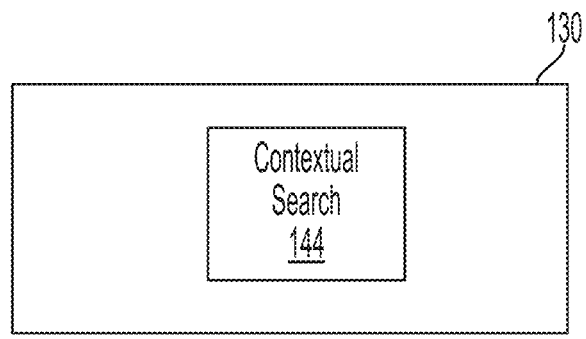
FIG. 7C is a schematic diagram of a customer concern insight generator of the insights generator of FIG. 6, in accordance with an embodiment.

FIG. 7C schematically depicts customer concern insight generator 130 for generating "Customer concern" insights from call report data, in accordance with an embodiment. As depicted, customer concern insight generator 130 includes contextual search 44. Contextual search 44 implements deep learning language modelling on call report text for a particular customer. In the depicted embodiment, the deep learning language modelling includes the eLMO model. Various other clustering or classification models may also be used by customer concern insight generator 130.

Figure 7D:
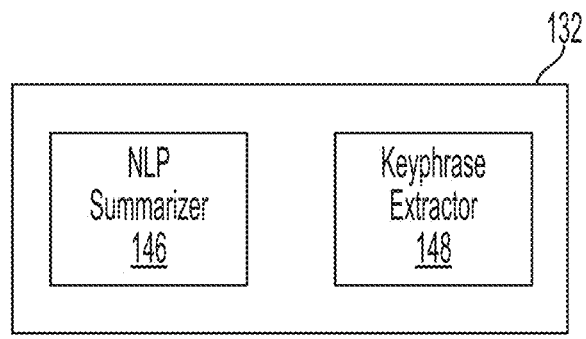
FIG. 7D is a schematic diagram of a summary generator of the insights generator of FIG. 6, in accordance with an embodiment.

FIG. 7D schematically depicts summary generator 132 for generating summaries of call reports, in accordance with an embodiment. As depicted, summary generator 132 includes NLP summarizer 146 and keyphrase extractor 148, which operate as an ensemble. In the depicted embodiment, NLP summarizer 146 implements the BART summarization model developed by Facebook to generate call report summaries. Keyphrase extractor 148 implements a NLP model to parse sentence structure and extract meaningful phases, such as the Stanza (CoreNLP) model provided by Stanford University.

In the depicted embodiment, summary generator 132 applies NLP summarizer 146 when a call report has a length in excess of 150 words, and applies keyphrase extractor 148 otherwise.

In another embodiment, summary generator 132 implements the BertSum deep learning summarization model. In this embodiment, the BertSum model is trained on the CNN Daily Mail dataset, but various other datasets can be used to train this or other models. Next, the TextBlob algorithm is applied to the generated summary to analyze the customer's sentiment. Various other clustering or classification models may also be used by summary generator 132.

Figure 8:
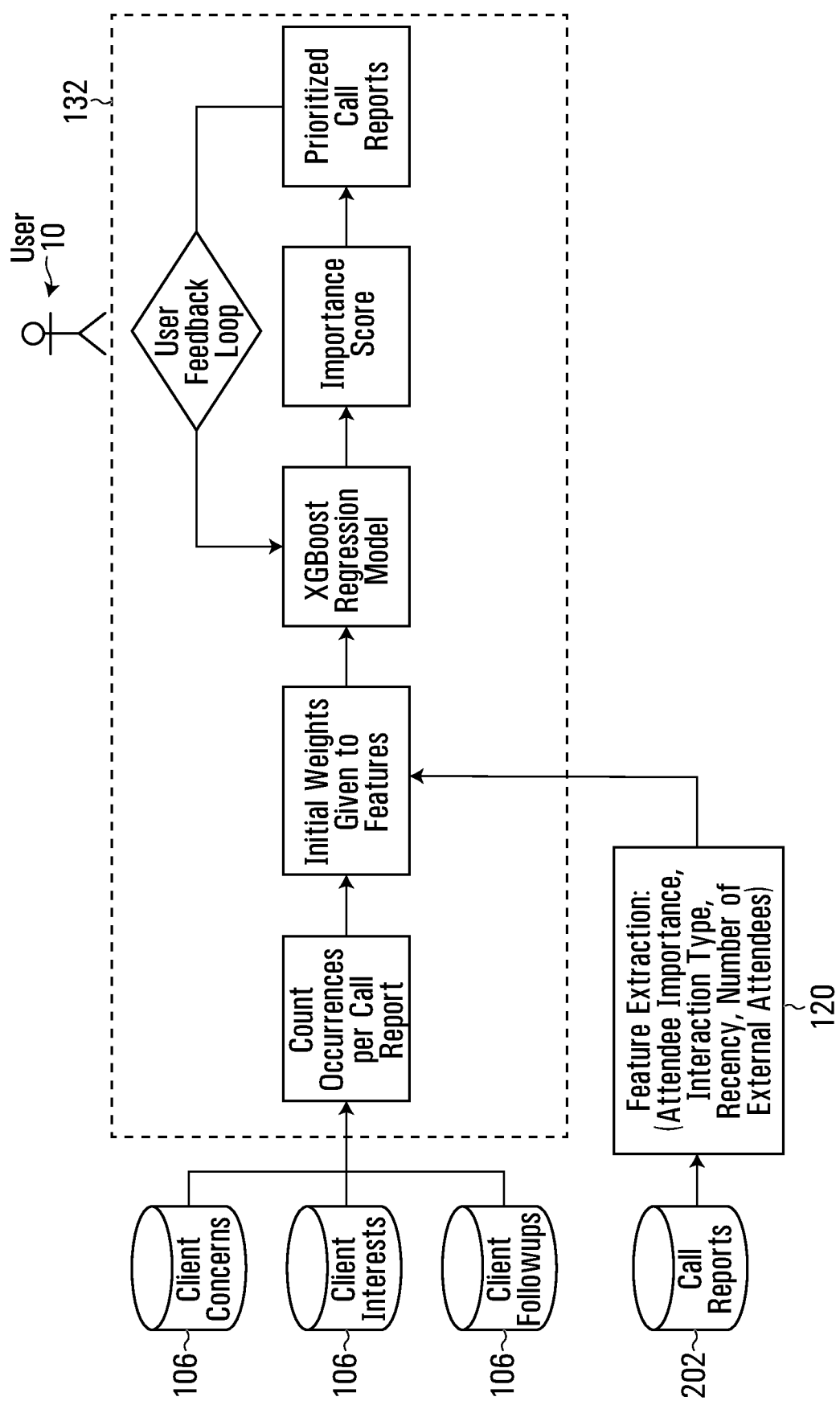
FIG. 8 is a workflow diagram for a priority generator of the insights generator of FIG. 6, in accordance with an embodiment.

FIG. 8 shows an example workflow for identifying the most important reports for a particular customer, in accordance with an embodiment. The region boxed in dotted lines may be implemented, for example, at priority generator 134 (FIG. 6).

As depicted, priority generator 134 receives call report data that is supplemented by feature enrichment, e.g., as performed by feature enricher 120. Features may include, for example, attendee importance (a report is more important if a more senior attendee was in attendance), interaction type (face-to-face or call), recency of report, number of external attendees, etc. Other features include the number of insights (e.g., concerns, interests, follow-ups) extracted from the customer report. Initial weights are assigned to these features and an trained model is applied to determine an importance score for each customer report. This model may, for example, be an XGBoost regression model. The customer reports are then ranked according to their respective scores. A pre-defined number (e.g., 5, 10, etc.) of top ranked reports for a particular customer are presented to user 10 in order of importance by way of the insights plugin 152.

In some embodiments, priority generator 134 calculates an importance scores for each insight 170, and different insights 170 generated from a call report may have different scores.

Figure 9A:
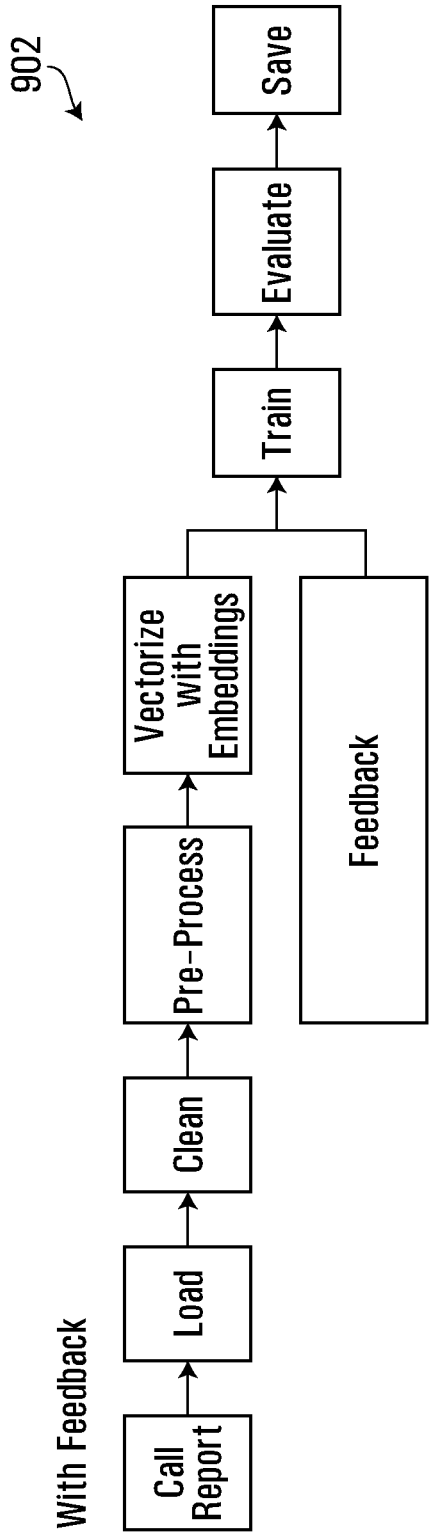
FIG. 9A and FIG. 9B each is a workflow diagram for training the priority generator of FIG. 6, in accordance with an embodiment.

In the depicted embodiment, user feedback data (e.g., obtained via GUI elements 180 and/or 182 of FIG. 3A) are used to train the model to recognize important call reports. FIG. 9A shows an example workflow 902 implemented at priority generator 134. As depicted, call report data, vectorized with embeddings, and user feedback data are used to train the model.

Figure 9B:
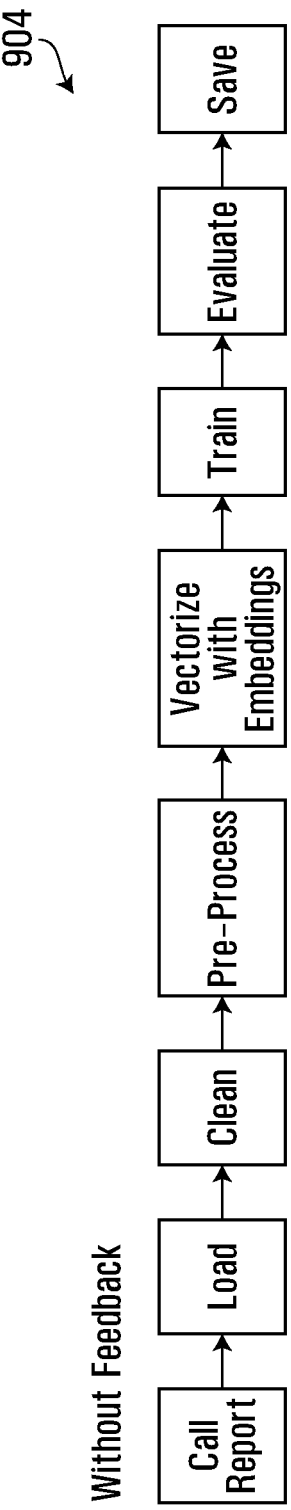

In another embodiment, the model is trained without user feedback data. FIG. 9B shows an example workflow 904 implemented at priority generator 134 in accordance with this other embodiment. As depicted, call report data, vectorized with embeddings, are used to train the model, without user feedback data.

Figure 10A:
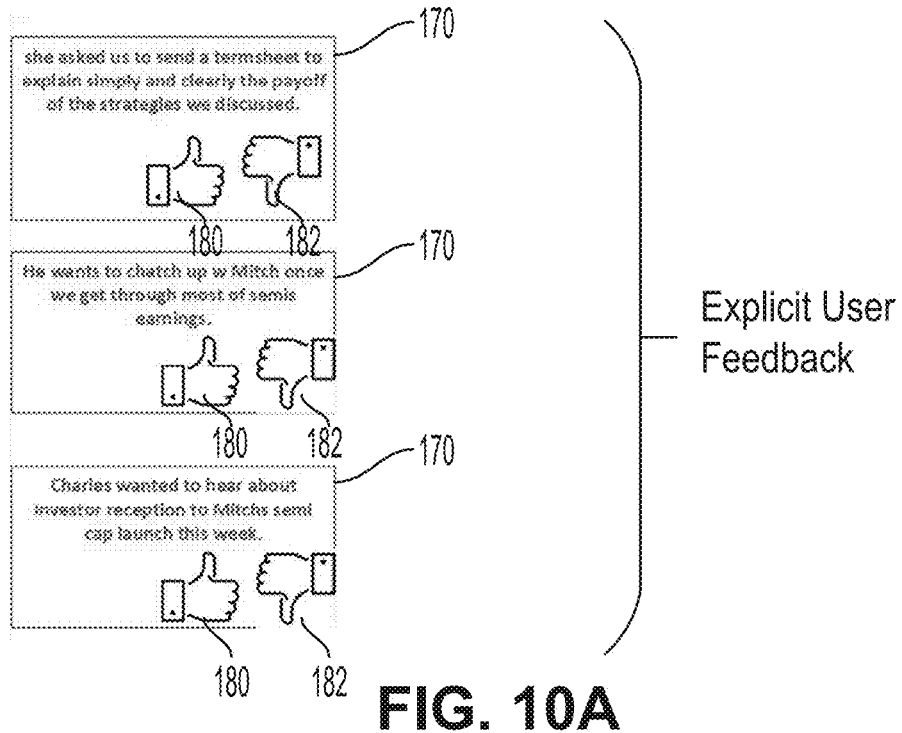
FIG. 10A and FIG. 10B each is a schematic diagram showing user feedback being provided, in accordance with an embodiment.

User feedback data may be obtained in the form of explicit user feedback or implicit user feedback. In the embodiment depicted in FIG. 3A, explicit user feedback is obtained via GUI elements 180 and/or 182. Referring to FIG. 10A, when a user 10 activates GUI elements 180 (a thumbs-up icon), explicit user feedback that the corresponding insight 170 is important is obtained. When a user 10 activates GUI elements 182 (a thumbs-down icon), explicit user feedback that the corresponding insight 170 is not important is obtained.

Figure 10B:
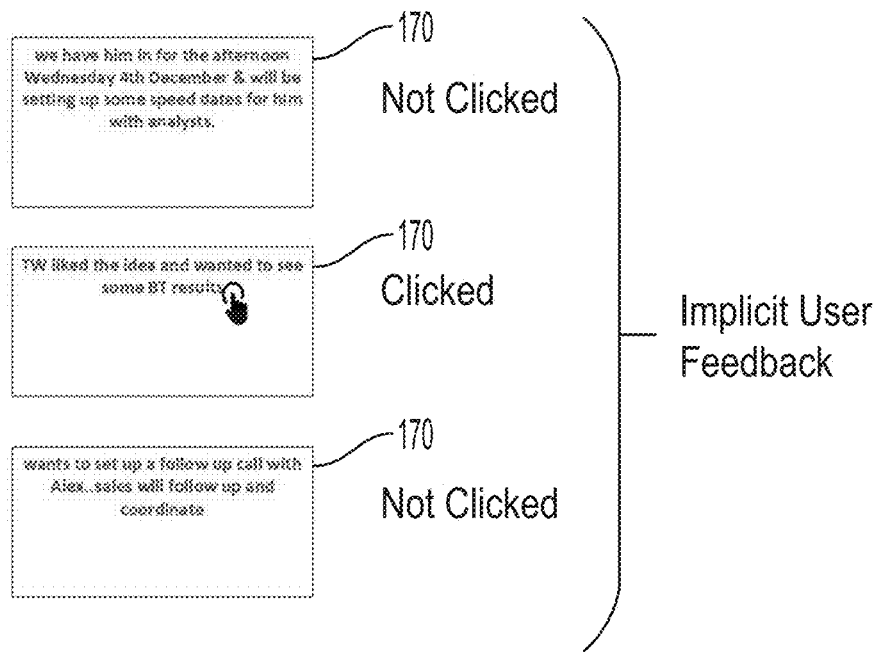

In another embodiment, implicit user feedback is obtained. Referring now to FIG. 10B, when a user 10 activates an insight 170 (e.g., to retrieve a summary of the call report from which the insight was generated), implicit user feedback that the insight 170 is important is obtained. For insights 170 that are not activated, implicit feedback that those insights 170 are not important is obtained. In this embodiment, GUI elements 180 and 182 can be omitted, thereby simplifying the GUI.

In another embodiment, both implicit user feedback and explicit user feedback are obtained.

Figure 11:
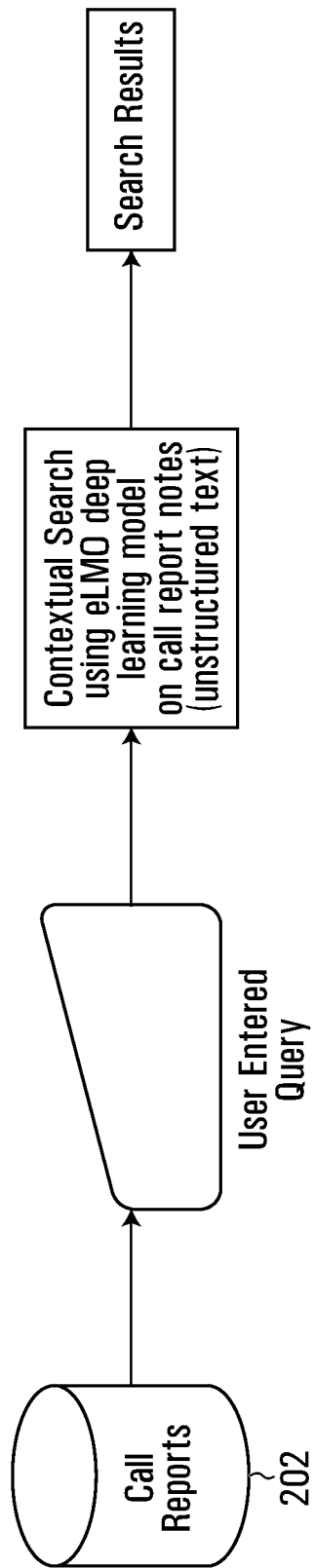
FIG. 11 is a workflow diagram of a customer report search engine, in accordance with an embodiment.

FIG. 11 shows the operation of a search engine for customer reports of a particular customer, in accordance with an embodiment. Search queries may be inputted by a user 10 by way of input box 172 (FIG. 3A). A contextual search using a language learning model (e.g., the eLMO deep learning model in one specific embodiment) is conducted, and search results can be presented by way of the GUI of insights plugin 152.

In some embodiments, one or more of follow-up insight generator 126, product interest insight generator 128, customer concern insight generator 130, summary generator 132, and priority generator 134 may implement a two-stage workflow to screen for false positives and/or false negatives.

Figure 12:
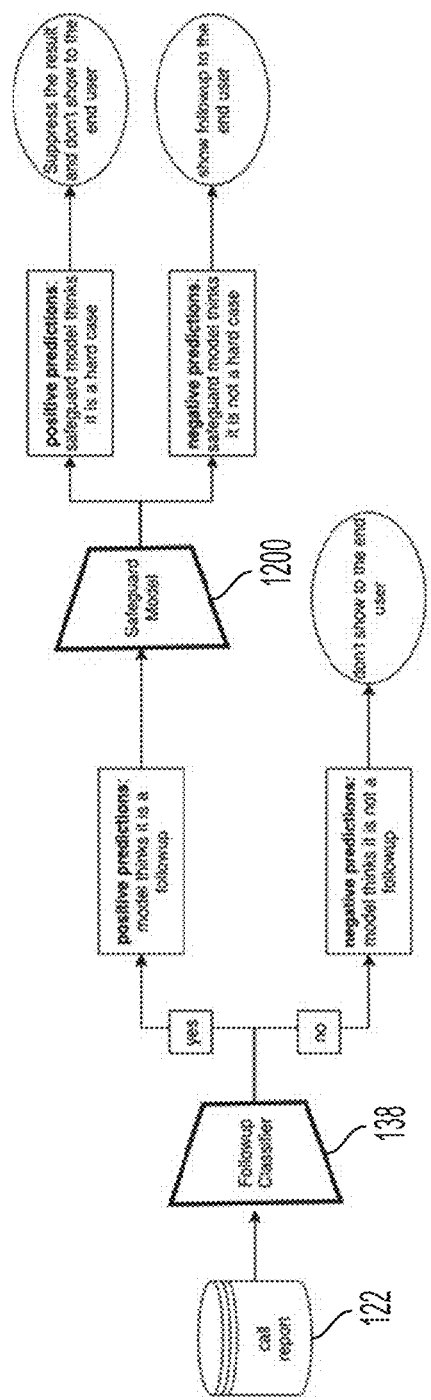
FIG. 12 is a workflow diagram a two-stage model, in accordance with an embodiment.

An example of this two-stage workflow, as implemented by follow-up insight generator 126 is depicted in FIG. 12. As depicted, the workflow has a first stage that includes follow-up classifier 138, and a second stage that includes a safeguard model 1200. Safeguard model 1200 is trained to detect cases that are likely to be classified incorrectly at the first stage, which may be referred to herein as "hard" cases. In particular, safeguard model 1200 may be trained to detect hard cases that are likely to be false positives and/or likely to be false negatives, as classified by classifier 138.

As depicted, when follow-up classifier 138 yields a positive result, i.e., classifier 138 predicts that there is a follow-up, this positive result is provided to safeguard model 1200. Safeguard model 1200 detects whether or not this result is a hard case. If it is detected as a hard case, the positive result is discarded. Otherwise, the positive result is stored as an insight in data store 106. Conversely, when follow-up classifier 138 yields a negative result, i.e., classifier 138 predicts that there is no follow-up, then the safeguard model 1200 is not used—the negative result is simply not stored as an insight.

Figure 13:
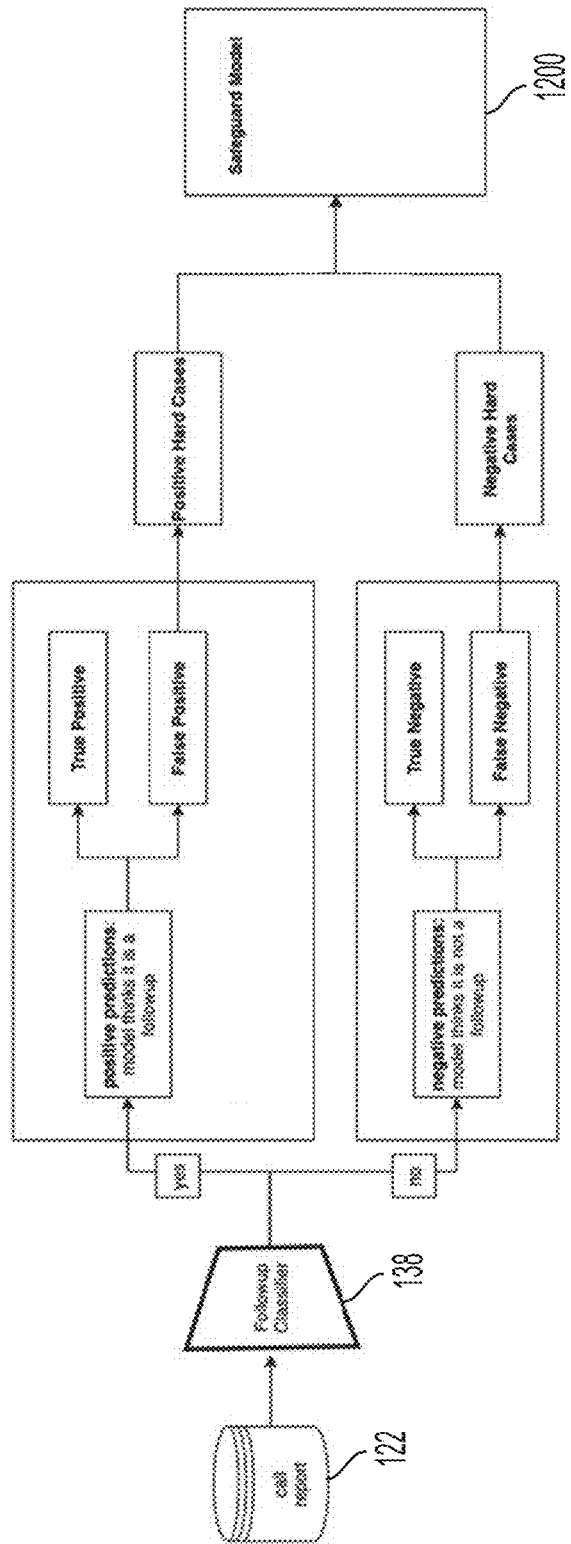
FIG. 13 is a workflow diagram of training the two-stage model of FIG. 12, in accordance with an embodiment.

FIG. 13 shows an example workflow for training safeguard model 1200. As depicted, the output of follow-up classifier 136 may be processed (e.g., manually) to label positive classification results as true positives or false positives. Labelled positive results are provided as training data to safeguard model 1200. Thus, safeguard model 1200 is trained to distinguish false positives from true positives, and can be used as a detector for hard cases that are likely to be false positives when classified by classifier 138.

Similarly, although not required for the workflow of FIG. 12, the output of follow-up classifier 136 may be processed to label negative classification results as true negatives or false negatives. Labelled negative results are provided as training data to safeguard model 1200. Thus, safeguard model 1200 is trained to distinguish false negatives from true negatives, and can be used as a detector for hard cases that are likely to be false negatives, when classified by classifier 138.

Figure 14:
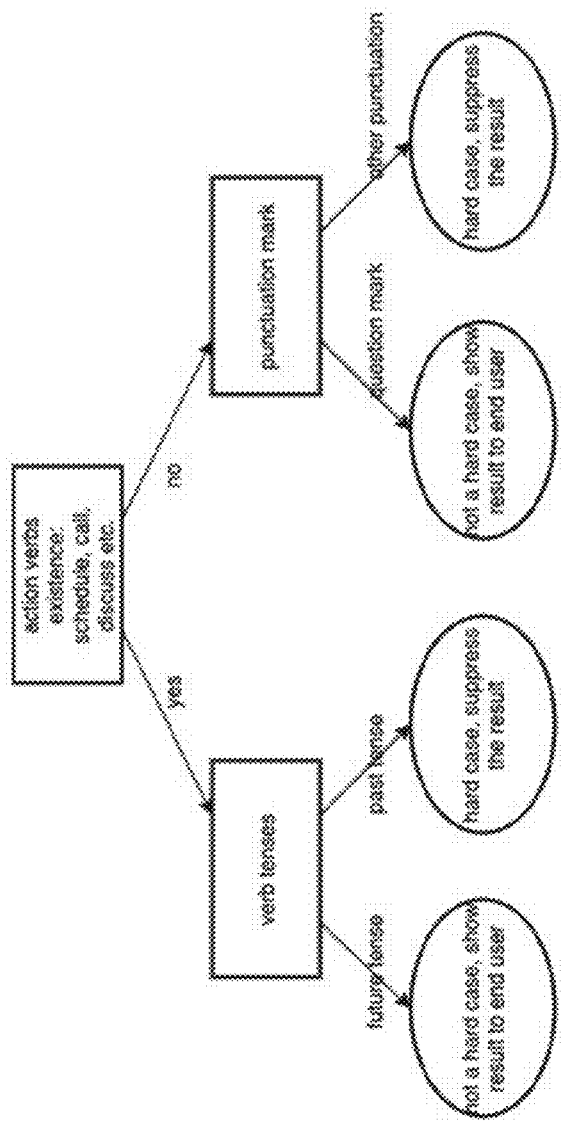
FIG. 14 is a schematic diagram of a boosting tree-based classifier, in accordance with an embodiment.

FIG. 14 depicts the implementation of safeguard model 1200 as a boosting tree-based classifier, in accordance with an embodiment. As depicted, the model includes features such as certain action verbs, verb tenses, and punctuation marks as learning features. Various other clustering or classification models may also be used to implement safeguard model 1200.

Figure 15:
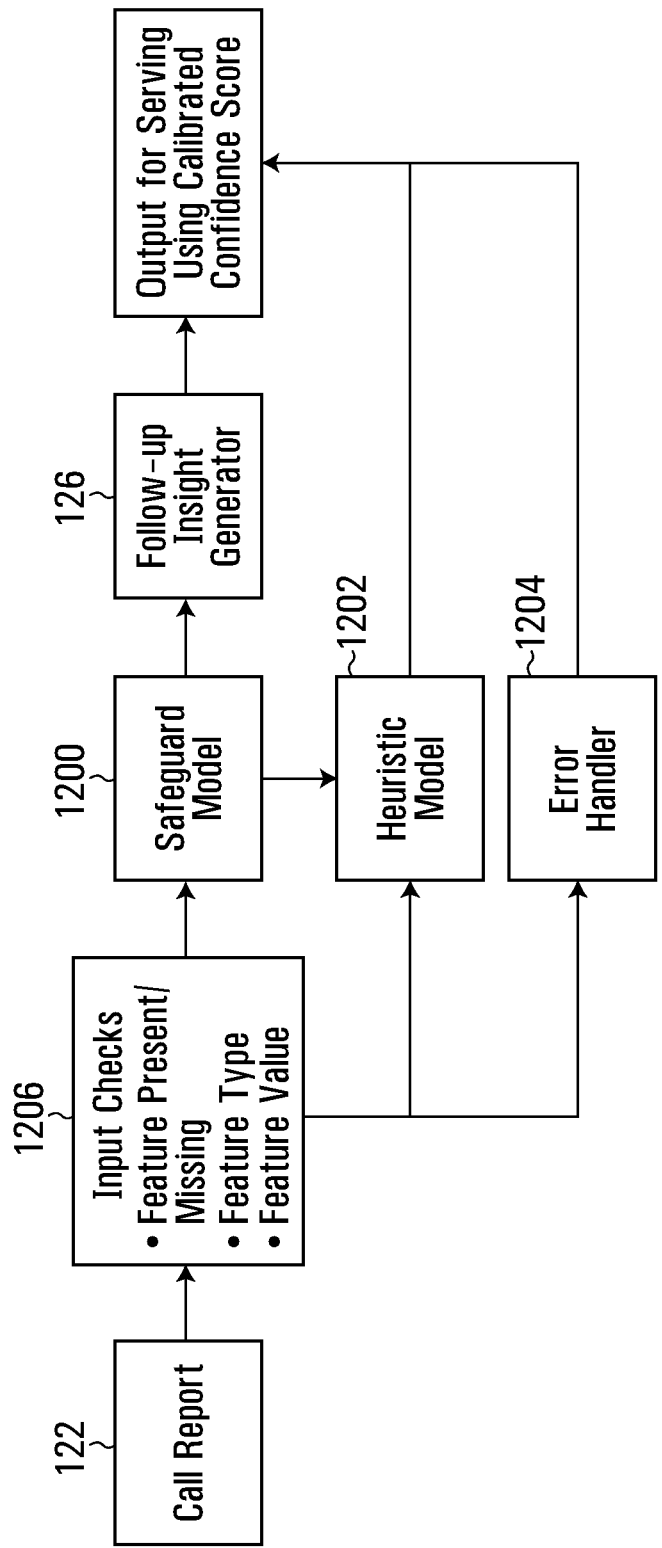
FIG. 15 is a workflow diagram of another two-stage model, in accordance with an embodiment.

In other embodiments, safeguard model 1200 may be used in a different two-stage workflow. For example, FIG. 15 depicts an example two-stage workflow that can be used in place of the workflow shown in FIG. 12. In this workflow, safeguard model 1200 is utilized in a first stage and follow-up insight generator 126 is used in a second stage. As depicted, if safeguard model detects a hard case, the hard case is passed to a heuristic model 1202 configured to process hard cases. Conversely, if safeguard model 1200 does not detect a hard case, then the case is passed to follow-up insight generator 126 for processing. Also shown is an input checker 1206, which detects an error when a case is missing certain features, has certain features of an unexpected type, or has certain features of an unexpected value. Such cases are diverted to error handler 1204 for processing.

In the depicted embodiment, heuristics model 1202 includes word and sentence stemming, Lemmatization based on a language corpus, and a regular expression based word enrichment and error correction process. The heuristics model determines sentence morphology and accounts for presence of certain phrases and words. The heuristics model then applies a set of pre-defined rules to make an overall determination of whether or not there is a follow-up. In other embodiments, heuristics model 1202 may include various other heuristics.

Conveniently, when safeguard model 1200 is located in the first stage, the follow-up insight generator 126 is not used to process hard cases. This may conserve compute resources and may improve efficiency.

Although the training and use of safeguard model 1200 has been described with reference to follow-up insights, safeguard model 1200 can also be used for other categories of insights.

In the embodiments described herein, one or more of electronic data stores 106, 108, 114, 118, 122 and 202 may implement a conventional relational, object-oriented, or document-oriented database, such as Microsoft SQL Server, Oracle, DB2, Sybase, Pervasive, MongoDB, NoSQL, etc.

In some embodiments, electronic data store 202 stores copies of past communications with customers (e.g., e-mails, attachments). In such embodiments, machine learning engine 110 processes these communications to generate machine learning results, which may be presented as insights 170. In some embodiments, machine learning engine 110 may process data sets that include both customer reports 206 and copies of past communications.

In an embodiment, customer insight system 100 includes a text-to-speech generator that converts insights displayable through insights plugin 152 (including, for example, summaries of call reports) to machine-generated speech. A user 10 can initiate playback of machine-generated speech by operating a button presented by insights plugin 152 (e.g., button 190 in FIG. 3B). In one specific embodiment, the text-to-speech generator may perform speech synthesis using Google WaveNet model. Conveniently, this allow a user 10 to receive insights by way of a phone call, e.g., while traveling to a customer meeting.

In the embodiment depicted in FIG. 3A and FIG. 3B, front-end 102 includes a CRM tool 150 that is an e-mail client. In other embodiments CRM tool 150 may be adapted for other forms of user-to-user communication such as, for example, instant messaging, short-messaging service, video conferencing, VoIP, or the like.

Figure 16A:
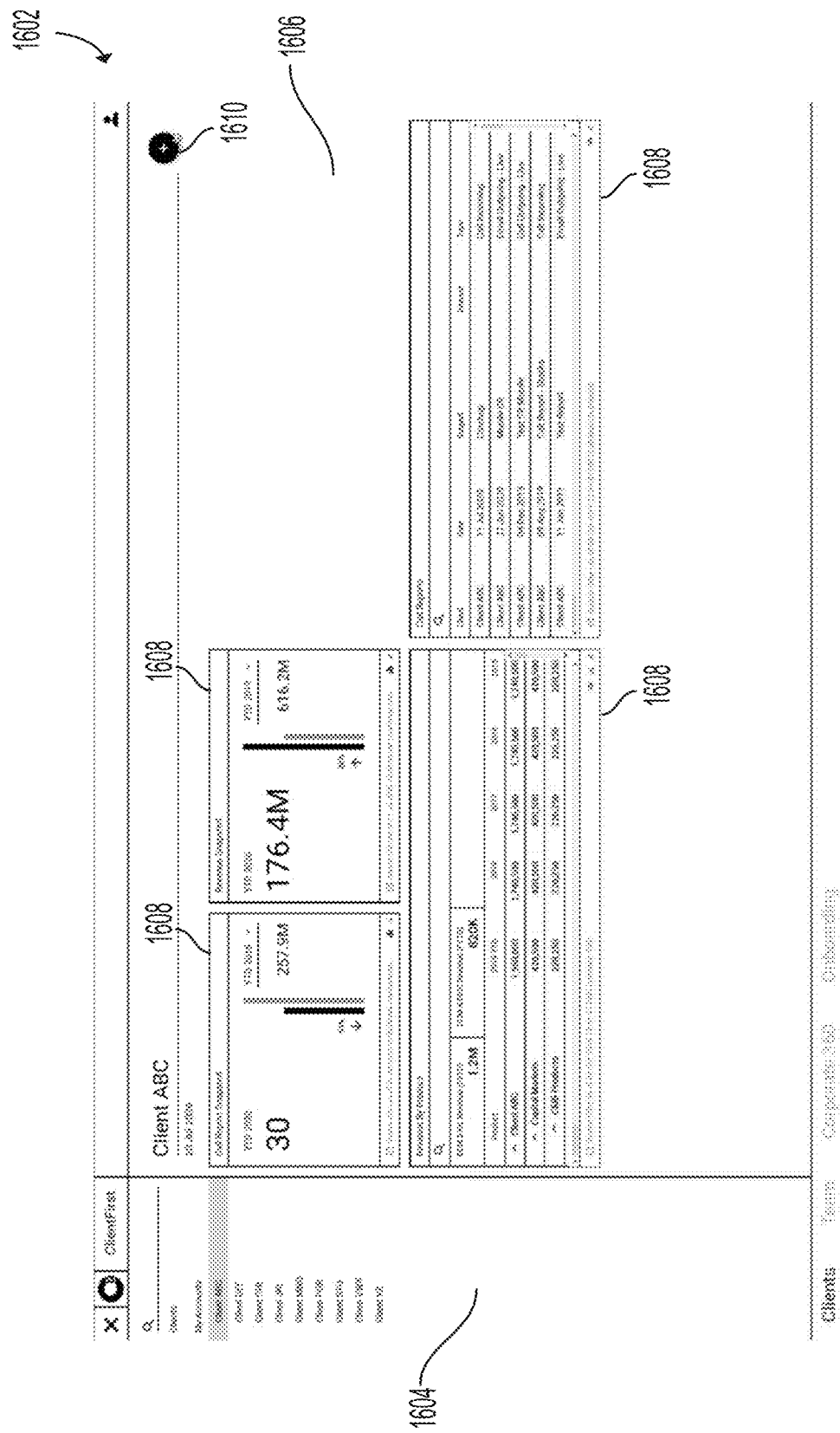
FIGS. 16A, 16B, and 16C each is an example GUI of the front-end of FIG. 2, in accordance with an embodiment.

In another embodiment, front-end 102 may include a CRM tool 150 for viewing customer data, such as data provided by CRM system 200. FIG. 16A shows an example screen of a GUI 1602 presented by front-end 102, in accordance with this embodiment. As depicted, GUI 1602 includes a panel 1604 displaying a list of customers, and for receiving a user selection of a particular customer. In this example, "Client ABC" has been selected, and is highlighted.

GUI 1602 also includes a panel 1606 having a plurality of regions 1608, each displaying selected information about the selected customer. For example, as depicted, panel 1606 includes a region 1608 providing information on number of call reports for the selected customer, a region 1608 providing revenue information for the selected customer, a region 1608 providing revenue information by product, and a region 1608 providing a log of call reports. From this log, each call report can be activated to retrieve and display the text of the call report and any associated metadata.

Other regions 1608 may be provided to show other types of customer information such as, for example, press releases, additional financial data, product information, etc.

Panel 1606 includes a button 1610 that can be activated to receive a user selection of region 1608 to be added or removed from panel 1606.

Figure 16B:
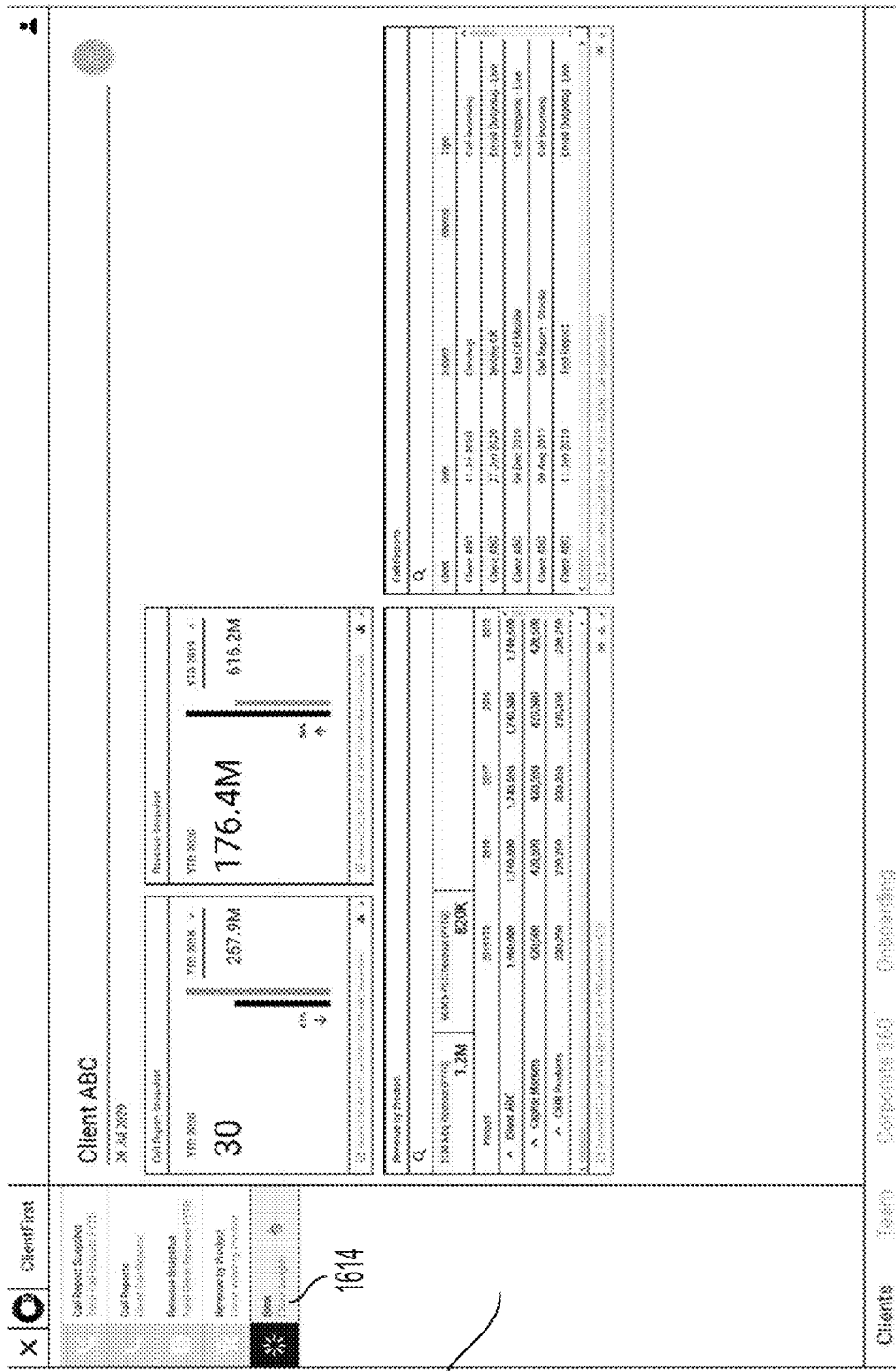

Activation of button 1610 causes panel 1604 to be replaced by panel 1612, as shown in FIG. 16B. Panel 1612 displays a list of available regions 1608, and is configured to receive a user selection of one or more regions 1608 to be added to panel 1606 or to be removed from panel 1606. As depicted, this selection includes an option 1614 to add a customer insights region 1608 to panel 1606.

Figure 16C:
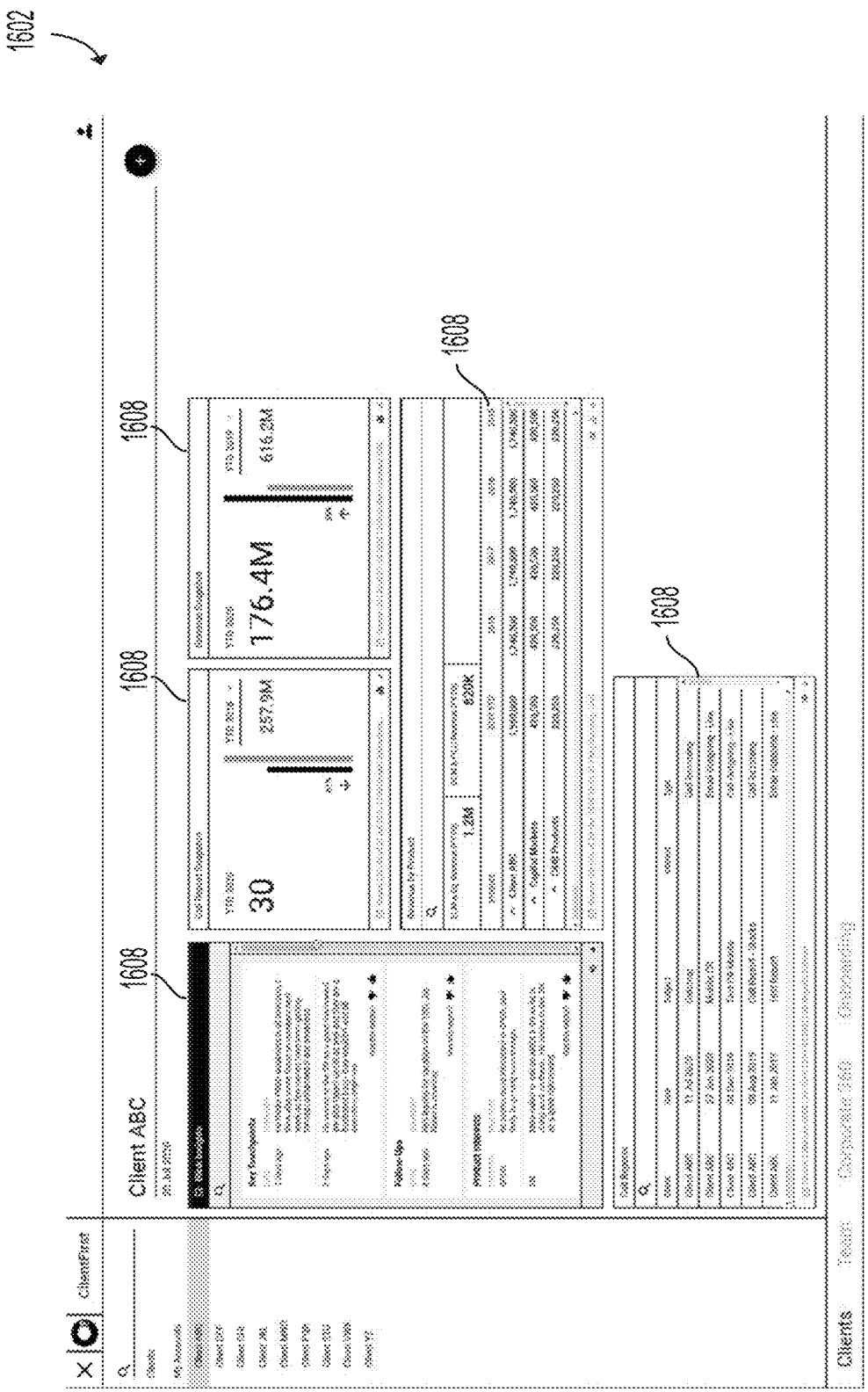

Activation of option 1614 causes customer insights region 1608 to be added to panel 1606, as shown in FIG. 16C. Customer insights region 1608 displays insights relevant to the selected customer (Client ABC). Customer insights region 1608 is substantially similar to region 252 described above.

Conveniently, customer insights region 1608 is displayed to user 10 when user 10 is interacting with one or more other regions 1608, e.g., viewing revenue data or making a user selection of a particular call report.

As will be apparent from the embodiments described herein, CRM tool 150 may be any type of software tool suitable for customer relationship management. For example, CRM tool 150 may be a tool having a general purpose such sending/receiving customer e-mail, or may be a tool having a specific purpose such as accessing certain customer information.

The operation of customer insight system 100 is further described with reference to the flowcharts depicted in FIG. 17 and FIG. 18.

Figure 17:
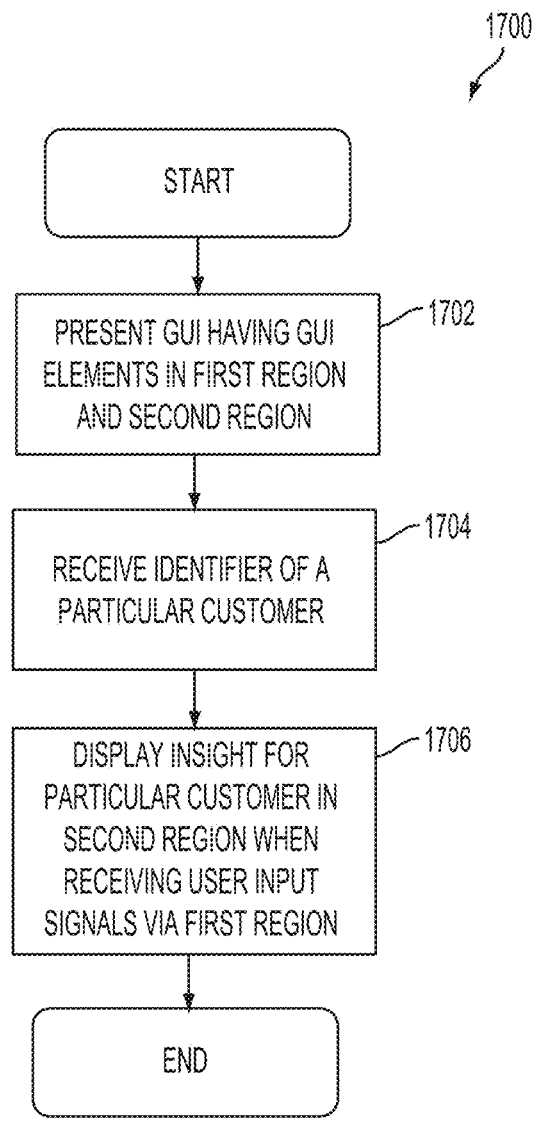
FIG. 17 and FIG. 18 each is a flowchart showing example operation of the customer insight system of FIG. 1, in accordance with an embodiment.

Referring now to FIG. 17, system 100 performs the example operations depicted at blocks 1700 and onward, in accordance with an embodiment.

At block 1702, system 100 presents, to a user 10, GUI 202 having: first region 250 having GUI elements of a CRM tool 150, and second region 252 having GUI elements for presenting at least one customer insight 170. Second region 252 is displayed when first region 250 is displayed, and is displayed to be proximate to first region 250.

At block 1704, system 100 receives an identifier of a particular customer. This identifier may be received, for example, by way of a GUI element of first region 252.

At block 1706, system 100 displays, to the user, at least one machine-learning derived insight 170 relevant to the identified customer. This insight 170 is displayed in second region 252 when system 100 receives user input signals via the GUI elements of first region 250.

Figure 18:
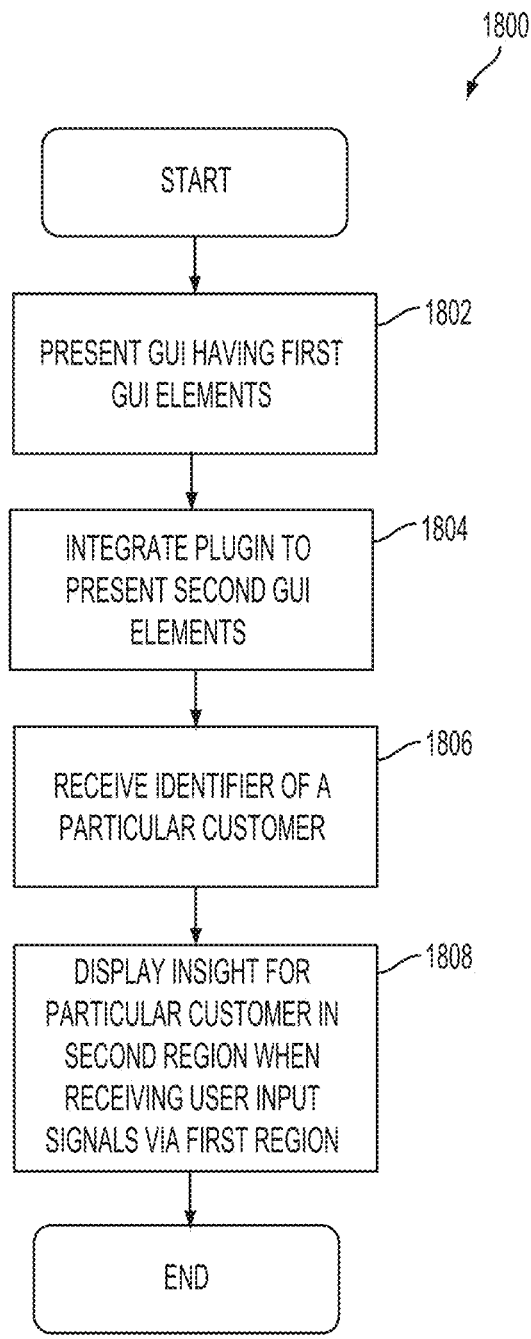

Referring now to FIG. 18, system 100 performs the example operations depicted at blocks 1800 and onward, in accordance with an embodiment.

At block 1802, system 100 presents, to a user 10, within CRM tool 150, first GUI elements for displaying customer relationship management data. These first GUI elements may, for example, be GUI elements of first GUI region 250.

At block 1804, system 100 integrates insights plugin 152 with CRM tool 150, to present second GUI elements for displaying customer insights. These second GUI elements may, for example, be GUI elements of second GUI region 252. The second GUI elements are displayed when the first GUI elements are displayed, and are displayed proximate the first GUI elements.

At block 1806, system 100 receives an identifier of a particular customer. This identifier may be received, for example, by way of the first GUI element.

At block 1808, system 100 displays to user 10, at least one machine-learning derived insight 170 relevant to the identified customer. This insight 170 is displayed via the second GUI elements, and is displayed when system 100 is receiving user input signals via the first GUI elements.

It should be understood that steps of one or more of the blocks depicted in FIG. 17 and FIG. 18 may be performed in a different sequence or in an interleaved or iterative manner. Further, variations of the steps, omission or substitution of various steps, or additional steps may be considered.

Figure 19:
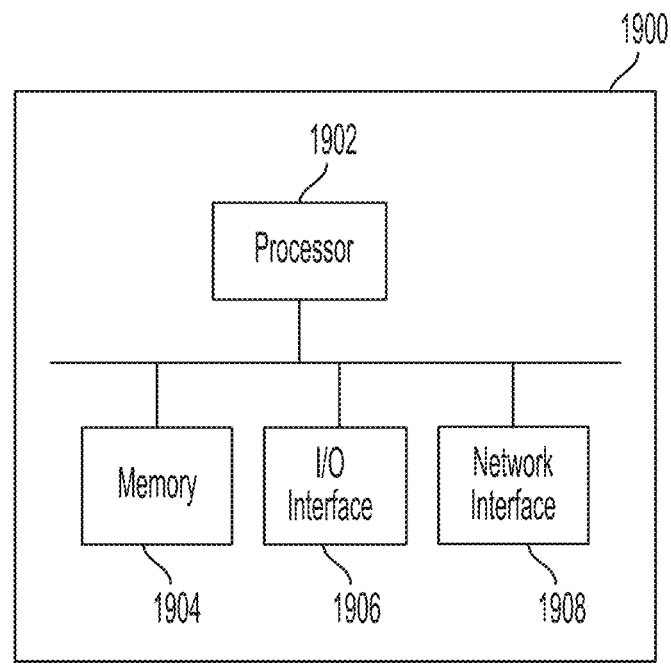
FIG. 19 is a schematic diagram of a computing device for implementing the systems of FIG. 1, in accordance with an embodiment.

FIG. 19 is a schematic diagram of a computing device 1900 that implements one or both of systems 100 and 200, exemplary of an embodiment. As depicted, computing device 1900 includes one or more processors 1902, memory 1904, one or more I/O interfaces 1906, and, optionally, one or more network interface 1908.

Each processor 1902 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1904 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 1904 may store code executable at processor 1902, which causes systems 100 and 200 to function in manners disclosed herein.

Each I/O interface 1906 enables computing device 1900 to interconnect with one or more input devices, such as a keyboard, mouse, camera, touch screen and a microphone, or with one or more output devices such as a display screen and a speaker.

Each network interface 1908 enables computing device 1900 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The methods disclosed herein may be implemented using a system that includes multiple computing devices 1900. The computing devices 1900 may be the same or different types of devices. For example, front-end 102 may be implemented at various computers that implement the functionality of an e-mail client (e.g., smart phones, tablets, desktop computers), which may be remote from the computing devices implementing back-end 104 and other components of system 100.

Each computing devices may be connected in various ways including directly coupled, indirectly coupled via a network, and distributed over a wide geographic area and connected via a network (which may be referred to as "cloud computing").

For example, and without limitation, each computing device 100 may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The embodiments and examples described herein are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer-implemented method for presenting customer insights in association with an electronic customer relationship management tool, the method comprising:
   presenting, to a user, a graphical user interface (GUI) having:
      a first region having GUI elements of the customer relationship management tool, and
      a second region having
         a first set of GUI elements for presenting at least one customer insight, the second region displayed when the first region is displayed and proximate to the first region; and
         a second set of GUI elements for receiving user feedback regarding the at least one customer insight;
   receiving user input signals via the GUI elements of the first region, the user input signals comprising an identifier identifying a customer;
   upon receiving the identifier identifying the customer:
      displaying, to the user, at least one machine-learning derived insight relevant to the identified customer in the second region based on the received user input signals via the GUI elements of the first region, wherein the machine-learning derived insight relevant to the identified customer in the second region comprises an importance score of the insight;
   receiving user input signals regarding the importance score of the insight via the second set of GUI elements of the second region; and
   refining the importance score of the insight based on the received user input signals via the second set of GUI elements of the second region.

2. The computer-implemented method of claim 1, further comprising processing electronic records of past communications with the particular customer to generate the at least one machine-learning derived insight.

3. The computer-implemented method of claim 2, wherein the electronic records of past communications include call reports.

4. The computer-implemented method of claim 1, further comprising generating the at least one machine-learning derived insight using a machine learning model.

5. The computer-implemented method of claim 4, wherein the machine learning model includes two stages.

6. The computer-implemented method of claim 5, wherein at least one of the two stages includes a model trained to detect cases that are likely to be classified incorrectly in the other of the two stages.

7. The computer-implemented method of claim 1, wherein the at least one machine-learning derived insight includes an identifier of a particular product in which the particular customer has expressed interest.

8. The computer-implemented method of claim 1, wherein the at least one machine-learning derived insight includes an identifier of a particular concern of the particular customer.

9. The computer-implemented method of claim 1, wherein the at least one machine-learning derived insight includes a ranked list of reports of past communications with the particular customer.

10. The computer-implemented method of claim 9, wherein the ranked list includes links to machine-generated summaries of the respective reports.

11. The computer-implemented method of claim 1, further comprising generating a summary of an electronic record of a past communication with the particular customer.

12. The computer-implemented method of claim 1, wherein the customer relationship management tool includes a user-to-user electronic communication interface.

13. The computer-implemented method of claim 12, wherein the user-to-user electronic communication interface includes at least one of e-mail, instant messaging, short-messaging service, video conferencing, or Vol P.

14. The computer-implemented method of claim 1, wherein the feedback is implicit feedback.

15. The computer-implemented method of claim 1, wherein the feedback is explicit feedback.

16. A computer-implemented system for presenting customer insights in association with an electronic customer relationship management tool, the system comprising:
   at least one processor;
   memory in communication with the at least one processor, and
   software code stored in the memory, which when executed by the at least one processor causes the system to:
      present, to a user, a graphical user interface (GUI) having:
         a first region having GUI elements of the customer relationship management tool, and
         a second region having
            a first set of GUI elements for presenting at least one customer insight, the second region displayed when the first region is displayed and proximate to the first region; and
            a second set of GUI elements for receiving user feedback regarding the at least one customer insight;
      receiving user input signals via the GUI elements of the first region, the user input signals comprising an identifier identifying a customer;

upon receiving the identifier identifying the customer:
display, to the user, at least one machine-learning derived insight relevant to the identified customer in the second region based on the user input signals via the GUI elements of the first region, wherein the machine-learning derived insight relevant to the identified customer in the second region comprises an importance score of the insight;

receiving user input signals regarding the importance score of the insight via the second set of GUI elements of the second region; and refining the importance score of the insight based on the received user input signals via the second set of GUI elements of the second region.

17. The computer-implemented system of claim 16 further comprising an electronic data store storing data records reflective of past reports of electronic communications with the particular customer.

18. A computer-implemented method of augmenting a customer relationship management tool to provide customer insights, the method comprising:

presenting, to a user, within the customer relationship management tool, a first region of GUI elements for displaying customer relationship management data, integrating a customer insights plugin with the customer relationship management tool, to present a second region displaying two sets of GUI elements comprising: a first set of GUI elements for displaying customer insights, and a second set of GUI elements for receiving user feedback regarding the at least one customer insight; the second region displayed when the first region is displayed, and proximate the first region;

receiving user input signals via the GUI elements of the first region, the user input signals comprising an identifier identifying a customer;

upon receiving the identifier identifying the customer:
displaying, to the user, at least one machine-learning derived insight relevant to the identified customer via the second GUI elements based on the received user input signals via the GUI elements of the first region, wherein the machine-learning derived insight relevant to the identified customer via the second GUI elements comprises an importance score of the insight;

receiving user input signals regarding the importance score of the insight via the second set of GUI elements of the second region; and refining the importance score of the insight based on the received user input signals via the second set of GUI elements of the second region.

\* \* \* \* \*